United States Patent [19]
Yoshizawa et al.

[11] Patent Number: 5,122,177
[45] Date of Patent: Jun. 16, 1992

[54] METHOD OF AND SYSTEM FOR PRESSING SHEET GLASS

[75] Inventors: Hideo Yoshizawa; Yasuhiko Saikawa; Mitsuo Tanaka, all of Osaka, Japan

[73] Assignee: Nippon Sheet Glass Co., Ltd., Osaka, Japan

[21] Appl. No.: 638,087

[22] Filed: Jan. 7, 1991

[30] Foreign Application Priority Data

Jan. 11, 1990 [JP] Japan .................................. 2-3910

[51] Int. Cl.5 .............................................. C03B 23/03
[52] U.S. Cl. ........................................ 65/106; 65/273; 65/287; 65/289
[58] Field of Search .................. 65/106, 273, 287, 289

[56] References Cited

U.S. PATENT DOCUMENTS

| | | | |
|---|---|---|---|
| 3,123,459 | 3/1964 | Hens | 65/106 |
| 3,529,947 | 9/1970 | Frank | |
| 3,554,724 | 1/1971 | Ritter et al. | 65/106 |
| 3,573,022 | 3/1971 | Frank | |
| 3,582,304 | 6/1971 | Bognar | |
| 3,595,636 | 7/1971 | Posney | |
| 4,043,782 | 8/1977 | Bamford et al. | |
| 4,071,345 | 1/1978 | Werner et al. | |
| 4,305,746 | 12/1981 | Hagedorn et al. | 65/106 |
| 4,396,410 | 8/1983 | Hagedorn et al. | 65/106 |
| 4,557,745 | 12/1985 | Halberschmidt et al. | |
| 4,615,931 | 10/1986 | Matsuyoshi et al. | |
| 4,756,735 | 7/1988 | Cathers et al. | |
| 4,973,344 | 11/1990 | Rahrig et al. | 65/106 |

FOREIGN PATENT DOCUMENTS

| | | |
|---|---|---|
| 799907 | 11/1968 | Canada |
| 0361263A2 | 4/1990 | European Pat. Off. |
| 61-28611 | 7/1986 | Japan |
| 63-63493 | 12/1988 | Japan |
| 1376946 | 12/1974 | United Kingdom |
| 2011377 | 7/1979 | United Kingdom |
| 2162170A | 1/1986 | United Kingdom |
| 2166133A | 4/1986 | United Kingdom |
| 2188045A | 9/1987 | United Kingdom |

Primary Examiner—Joye L. Woodard
Attorney, Agent, or Firm—Merchant, Gould, Smith, Edell, Welter & Schmidt

[57] ABSTRACT

A glass sheet is heated nearly to its softening point while being passed through a heating furnace. The heated glass sheet is then clamped at its peripheral edge between first and second molds. Thereafter, a third mold is pressed against a central region of the glass sheet with the peripheral edge thereof clamped, thereby to project the central region from one side to the other side thereof. The glass sheet is thus pressed to a desired highly curved shape with no wrinkles or cracks developed therein. The glass sheet is clamped and pressed by a pressing apparatus which includes a fixed concave ring mold as the first mold, and a movable convex mold comprising a peripheral mold assembly as the second mold and a central mold member as the third mold. The glass sheet thus curved is typically used as a front or rear window glass sheet for automobiles.

10 Claims, 5 Drawing Sheets

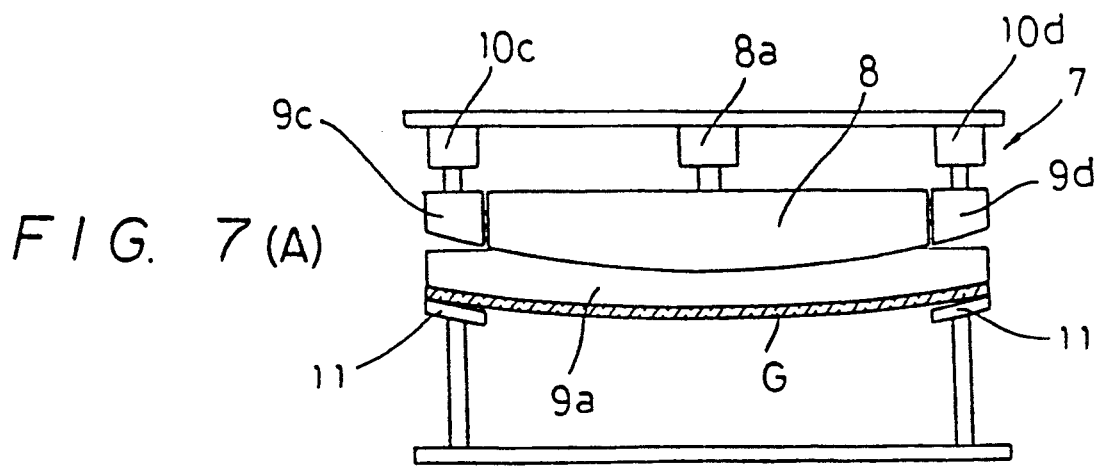
F I G. 7 (A)
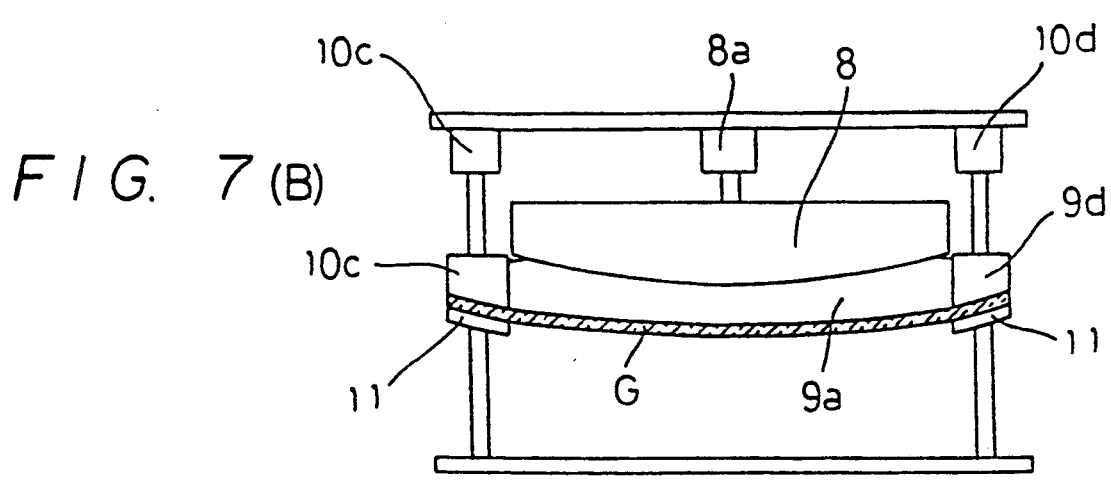
F I G. 7 (B)
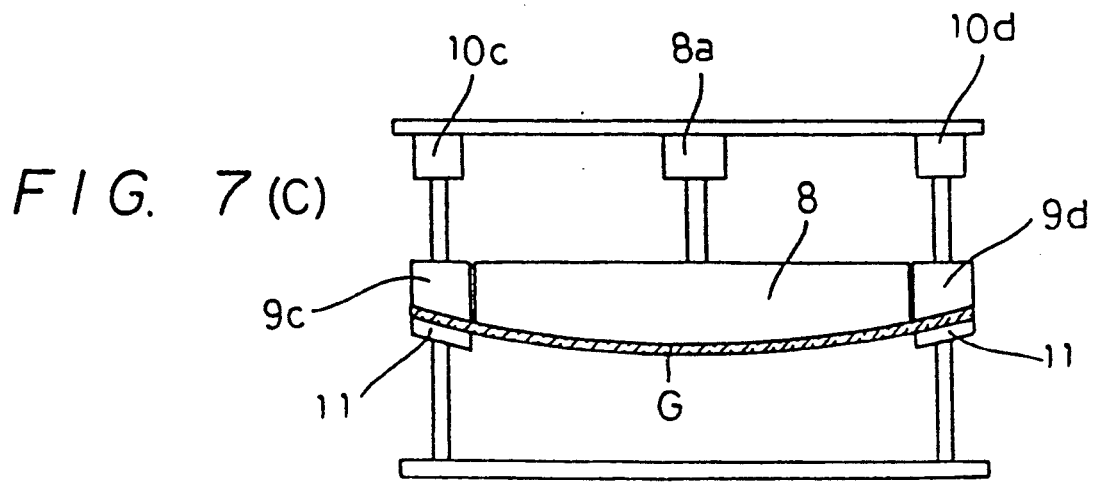
F I G. 7 (C)

METHOD OF AND SYSTEM FOR PRESSING SHEET GLASS

BACKGROUND OF THE INVENTION

1. Field of the Invention

The present invention relates to a method of and a system for pressing a sheet of glass into a highly curved sheet of glass which has a relatively small radius of curvature.

2. Description of the Prior Art

Some front and rear window glass sheets on automobiles are curved to relatively small radii of curvature. One known apparatus for bending a sheet of glass to a small radius of curvature is disclosed in Japanese Patent Publication No. 61(1986)-28611.

The disclosed apparatus has convex and concave molds for bending a glass sheet therebetween. The concave mold is composed of a central pressing mold member, and left and right pressing mold members. After the glass sheet is clamped between the central pressing mold member and the convex mold, the glass sheet is pressed to a curved shape between the central, left, and right mold members and the convex mold.

The convex mold and the concave mold, which is divided into the mold members, are however incapable of sufficiently stretching a central region of the glass sheet, so that the pressed glass sheet tends to have a insufficiently curved configuration. If the glass sheet were forcibly curved to correct insufficiently curved configuration, then the glass sheet would be liable to crack due to undue pressure. If the entire surface of the glass sheet were heated to high temperature, then a press mark would be left on the peripheral edges of the glass sheet by surface materials on the molds.

According to a solution disclosed in Japanese Patent Publication No. 61(1986)-17775, only the central region of a glass sheet is heated to a higher temperature than the other regions thereof, so that only the central region of the glass sheet can be curved to a greater degree. However, it has proven highly difficult to control the localized heating accurately.

SUMMARY OF THE INVENTION

In view of the aforesaid problems of the conventional methods and apparatus for pressing a sheet of glass to curved shape, it is an object of the present invention to provide a method of and a system for easily pressing a sheet of glass to a highly curved sheet of glass having a relatively small radius of curvature without developing defects such as cracks or the like in the sheet of glass.

According to the present invention, there is provided a method of pressing a glass sheet, comprising the steps of heating the glass sheet nearly to a softening point thereof by passing the glass sheet through a heating furnace, clamping only a peripheral edge of the heated glass sheet between first and second molds, and pressing a third mold against a central region of the glass sheet with the peripheral edge thereof clamped, thereby to project the central region from one side to the other side thereof, whereby the glass sheet is pressed to a curved shape.

The above method may be carried out by a system for pressing a sheet glass, comprising a heating furnace for heating the glass sheet nearly to a softening point, and a pressing apparatus for clamping only a peripheral edge of the heated glass sheet at opposite sides thereof, and projecting only a central region of the glass sheet, which is surrounded by the clamped peripheral edge thereof, from one of the sides to the other side thereof, whereby the glass sheet is pressed to a curved shape.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 7(A) is a front elevational view showing the pressing apparatus in a first phase of operation for pressing a sheet of glass;

FIG. 7(B) is a front elevational view showing the pressing apparatus in a second phase of operation for pressing a sheet of glass;

FIG. 7(C) is a front elevational view showing the pressing apparatus in a third phase of operation for pressing a sheet of glass.

DESCRIPTION OF THE PREFERRED EMBODIMENTS

Figure 1:
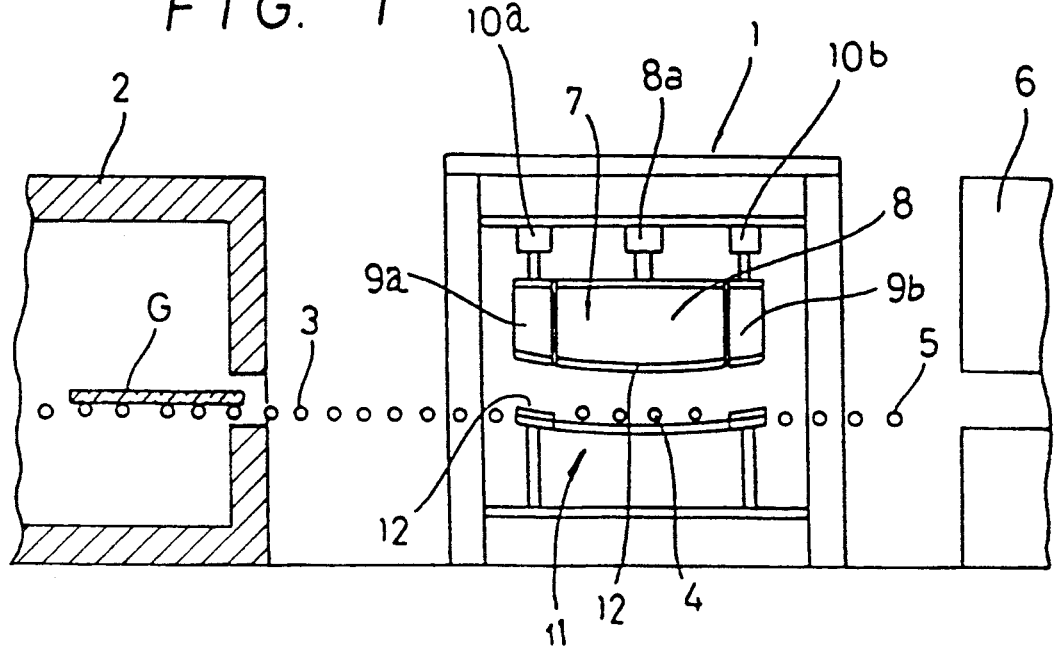
FIG. 1 is a fragmentary front elevational view of a system for pressing a sheet of glass to curved shape according to a preferred embodiment of the present invention.

FIG. 1 schematically shows a pressing system which includes an apparatus, generally denoted at 1, for pressing a glass sheet G to a highly curved shape. The glass sheet G is heated nearly to a softening point thereof by a heating furnace 2 located upstream of the pressing apparatus 1, while the glass sheet G is traveling through the heating furnace 2. The heated glass sheet G is transferred by feed rolls 3 onto in-mold rolls 4 in the apparatus 1, in which the glass sheet G is pressed to a desired curved shape. After the glass sheet G is pressed, it is delivered into a cooling device 6 by feed rolls 5. The feed rolls 3, the in-mold rolls 4, and the feed rolls 5 jointly serve as a feed mechanism for feeding the glass sheet G successively through the heating, pressing, and cooling stations.

Figure 2:
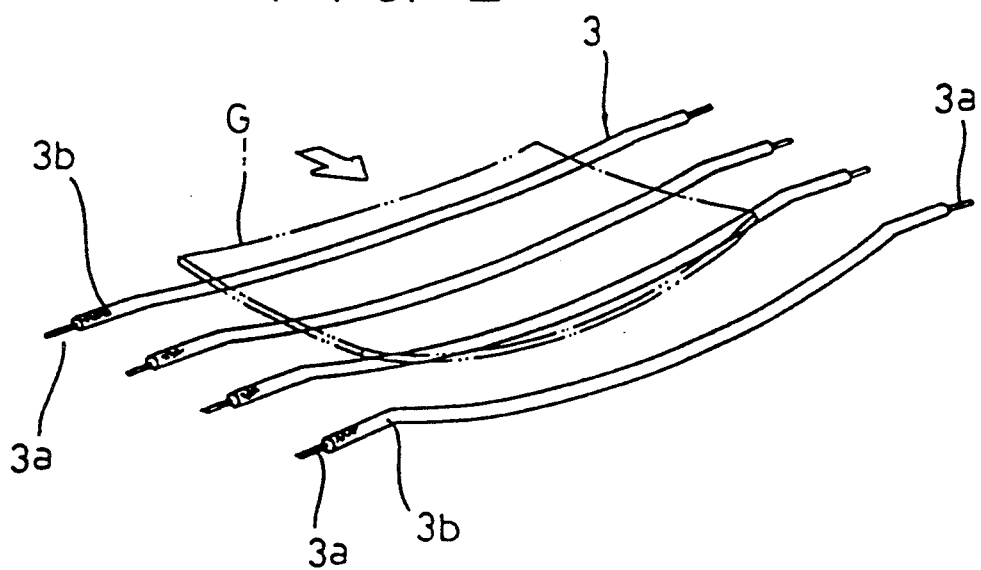
FIG. 2 is a perspective view of preliminary shaper rolls as a feed means capable of preliminarily shaping a heated sheet of glass in the pressing system shown in FIG. 1.

As shown in FIG. 2, each of the feed rolls 3 is in the form of a preliminary shaper roll comprising a core 3a curved to a shape which is preliminarily to be given to the glass sheet G, and a heat-resistant sleeve 3b rotatably fitted over the core 3a. Therefore, the glass sheet G is preliminarily shaped to a preliminary shape by the feed rolls 3 while being delivered by the feed rolls 3. When the preliminarily shaped glass sheet G is subsequently pressed by the pressing apparatus 1, the glass sheet G can be pressed to a large curvature without undue stresses because the glass sheet G does not undergo a large abrupt change in shape.

Figure 3:
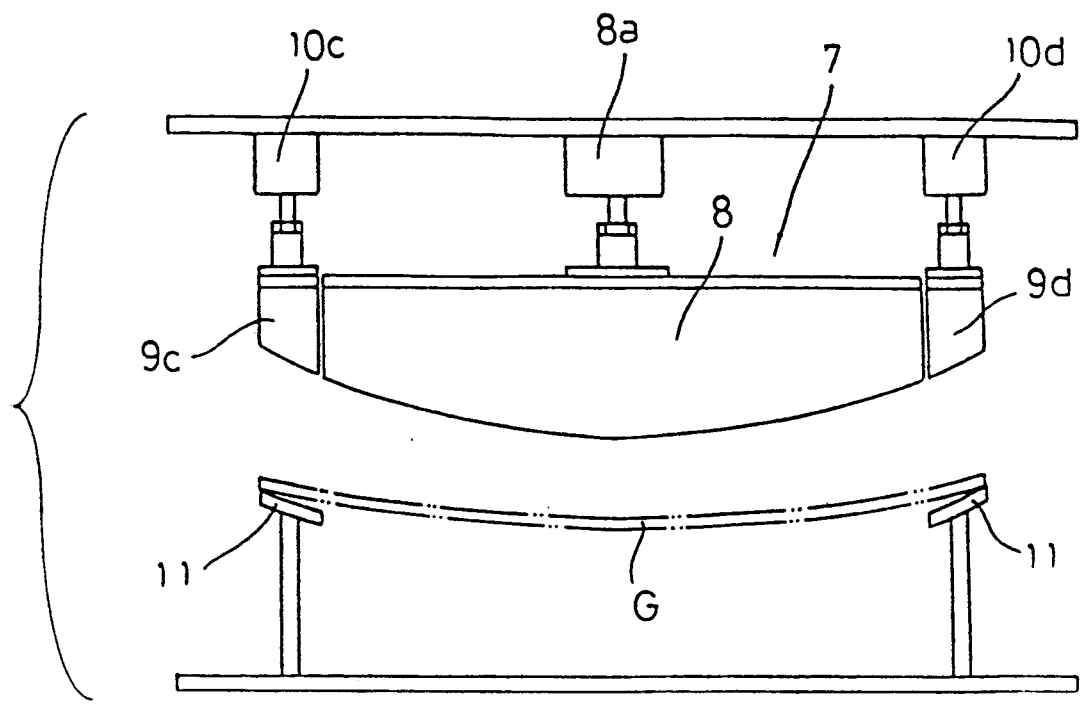
FIG. 3 is an enlarged front elevational view of a central mold member and left and right side mold members of a convex mold of a pressing apparatus in the pressing system.
Figure 4:
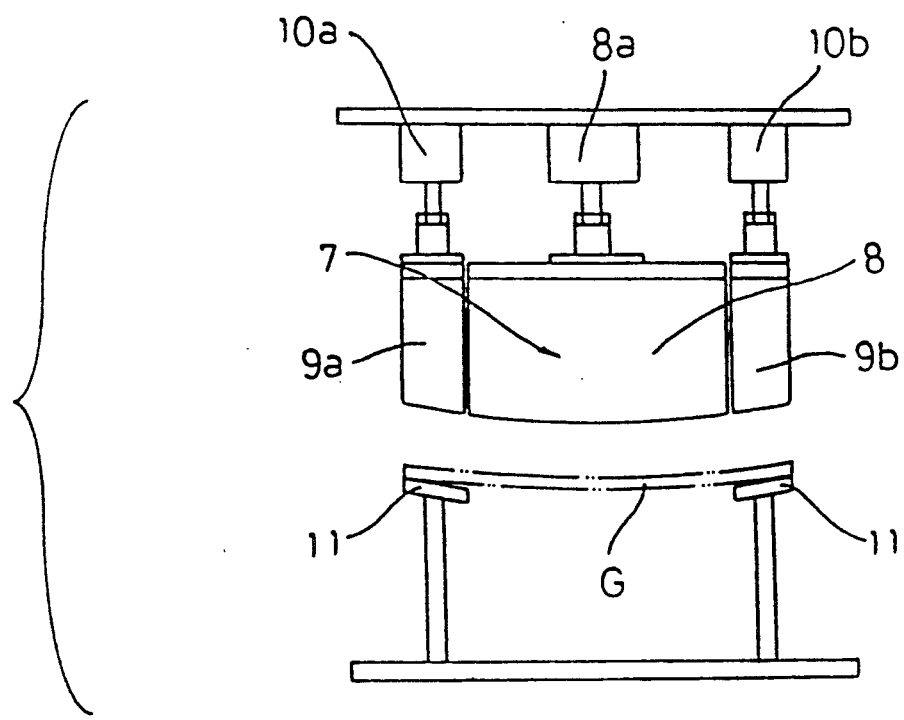
FIG. 4 is an enlarged side elevational view of the central mold member and front and right side mold members of the convex mold of the pressing apparatus.
Figure 5:
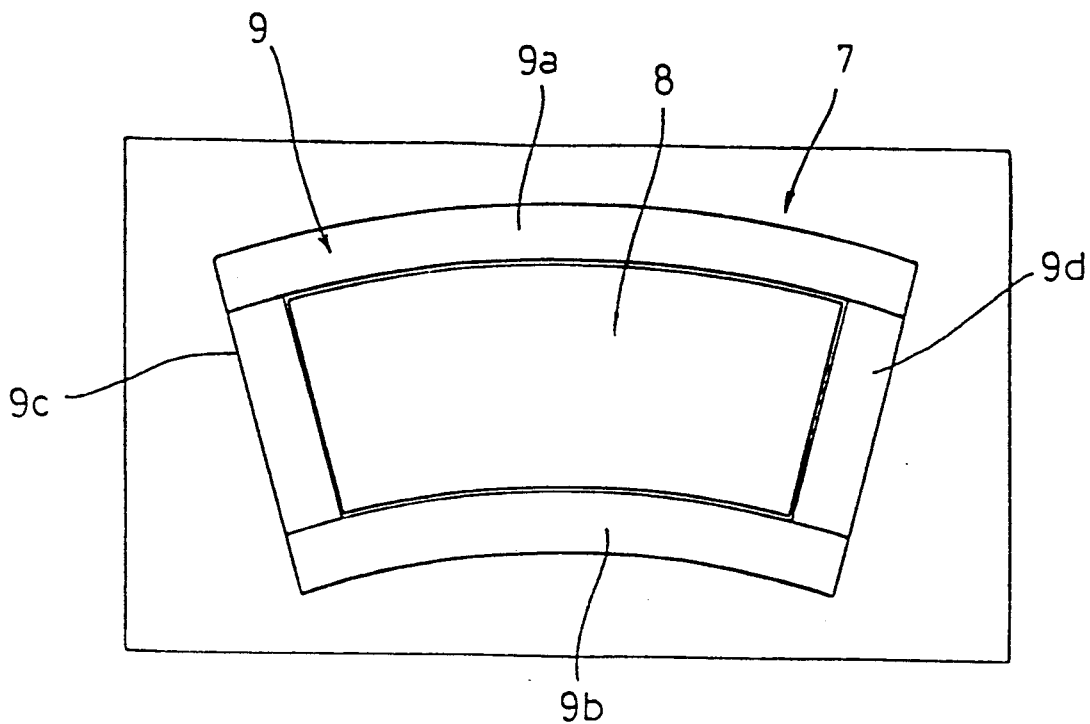
FIG. 5 is a bottom view of the convex mold of the pressing apparatus.
Figure 6:
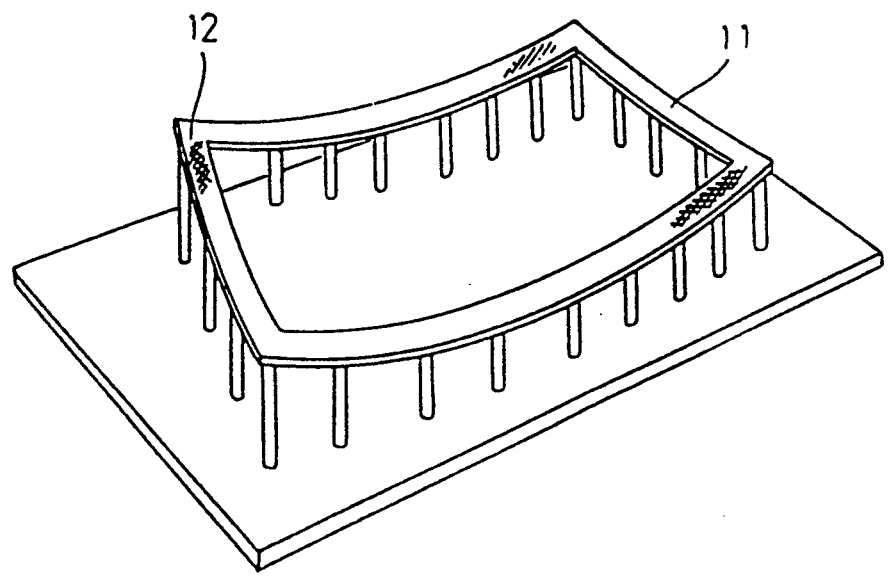
FIG. 6 is a perspective view of a concave mold of the pressing apparatus.

The pressing apparatus 1 generally comprises an upper convex mold 7 having a convex shaping surface and a lower concave mold 8 having a concave shaping surface which is substantially complementary to the convex shaping surface of the upper convex mold 7. As shown in FIG. 5, the upper convex mold 7 is composed of a central mold member 8 and a peripheral mold assembly 9 disposed around the central mold member 8. The peripheral mold assembly 9 comprises front and rear side mold members 9a, 9b (FIG. 4) which are spaced from each other in the direction in which the glass sheet G is fed, and left and right side mold members 9c, 9d (FIG. 3) spaced from each other in a direction substantially normal to the direction in which the glass sheet G is fed. The side mold members 9a, 9b, 9c, 9d can independently be moved vertically by respective cylinder units 10a, 10b, 10c, 10d (actuator means). The central mold member 8 can also independently be moved vertically by a cylinder unit 8a (actuator means). As shown in FIG. 6, the lower concave mold 11 is in the form of a fixed unitary ring mold for supporting only the peripheral edge of the glass sheet G. In the illustrated embodiment, therefore, the upper convex mold 7 is vertically movable by the cylinder units 8a and 10a through 10d, whereas the lower concave mold 11 is vertically fixed in position.

The shaping surface of each of the molds 7, 8 is covered with a surface material layer 12 attached thereto, as shown in FIG. 6. The surface material layer 12 may be made of a woven or felt layer of glass fibers, ceramic fibers, metallic fibers, aramid fibers, or the like.

To press the glass sheet G, the glass sheet G is heated nearly to its softening point while being passed through the heating furnace 2. The heated glass sheet G is preliminarily shaped by the feed rolls 3 and transferred onto the in-mold rolls 4 in the pressing apparatus 1. Then, the in-mold rolls 4 are lowered to place the glass sheet G on the lower concave mold 11. Alternatively, the lower concave mold 11 may be elevated to receive the glass sheet G from the in-mold rolls 4.

Substantially at the same time, the cylinder units 10a, 10b are extended to lower the front and rear side mold members 9a, 9b to clamp the glass sheet G at its front and rear peripheral edge portions between the front and rear side mold members 9a, 9b and the lower concave mold or ring mold 11, as shown in FIG. 7(A) (first phase of operation of the pressing apparatus 1).

Then, as shown in FIG. 7(B), the cylinder units 10c, 10d, 8a are extended to lower the side mold members 9c, 9d and the central mold member 8, thus bending the overall surface of the glass sheet G (second phase of operation of the pressing apparatus 1). At this time, the central mold member 8 is further lowered after the entire peripheral edge of the glass sheet G is fixed or clamped by the side mold members 9a, 9b, 9c, 9d and the lower concave mold 11. Stated otherwise, prior to further downward movement of the central mold member 8, the left and right peripheral edge portions of the glass sheet G are clamped between the side mold members 9c, 9d of the upper convex mold member 7 and the lower concave mold member 11 (by this time, the front and rear peripheral edge portions of the glass sheet G have already been clamped between the side mold members 9a, 9b and the lower concave mold 11). Therefore, the entire peripheral edge of the glass sheet G is completely pressed by the side mold members 9a, 9b, 9c, 9d and the lower concave mold 11 before the central region of the glass sheet G is pressed between the central mold member 8 and the lower concave mold 11.

Thereafter, as shown in FIG. 7(C), the central mold member 8 is further lowered to stretch and project the central region of the glass sheet G further downwardly from an upper side to a lower side thereof, thus pressing the glass sheet G to a desired curved shape (third phase of operation of the pressing apparatus 1). Then, the glass sheet G is delivered by the feed rolls 5 into the cooling device 6, in which the glass sheet S is quickly cooled and hence tempered.

In FIGS. 7(A), 7(B), and 7(C), the side mold member 9b is omitted from illustration. While the lower concave mold 11 is shown as being a ring mold, it may be a full-surface mold for contacting the entire lower surface of the glass sheet S.

In the above embodiment, in order to clamp the peripheral edge of the glass sheet G between the convex and convex molds 7, 8 before the central mold member 8 is lowered, the front and rear side mold members 9a, 9b are lowered, and thereafter the left and right mold members 9c, 9d are lowered. However, the four side mold members 9a, 9b, 9c, 9d may simultaneously be lowered to clamp all the peripheral portions of the glass sheet G between the convex and concave molds 7, 11 at the same time.

Figure 8:
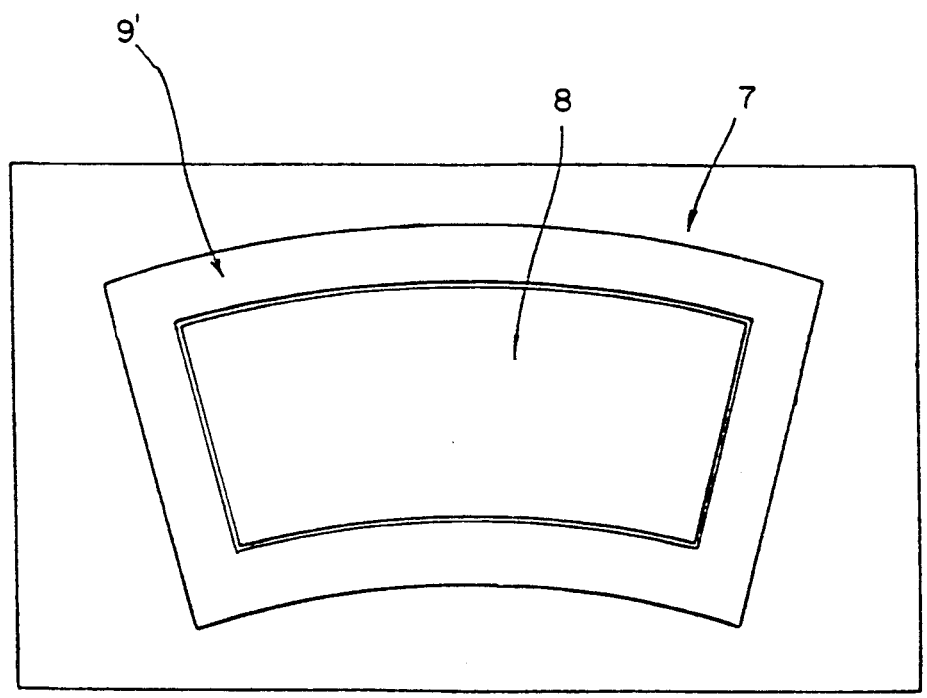
FIG. 8 is a bottom view of a modified convex mold according to the present invention.

Furthermore, while the peripheral mold assembly 9 of the upper convex mold 7 is constructed of the four side mold members 9a, 9b, 9c, 9d, the peripheral mold assembly may comprise, as shown in FIG. 8, a unitary upper ring mold member 9' which neatly mate with the unitary lower ring mold 11. In operation, before the central mold member 8 is lowered, the upper ring mold member 9' is lowered in its entirety to clamp the entire peripheral edge of the glass sheet G between itself and the lower concave mold 11. The upper ring mold member 9' is simper in construction and allows a quicker pressing process than the peripheral mold assembly 9 shown in FIG. 5.

With the present invention, as described above, the peripheral edge of the glass sheet is first clamped between the peripheral edge of the convex mold and the concave mold, and then the central mold member of the convex mold is pressed against the central region of the glass sheet and pushed further to curve the central region of the glass sheet. Therefore, a sheet of glass can be pressed accurately to a highly curved shape without wrinkles or cracks. The sheet of glass thus curved is suitable for use as front and rear window glass sheets for automobiles.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A method of pressing a glass sheet, comprising the steps of:

heating the glass sheet nearly to a softening point thereof by passing the glass sheet through a heating furnace;

clamping only a peripheral edge of the heated glass sheet between first and second molds; and pressing a third mold against a central region of the glass sheet with the peripheral edge thereof clamped, thereby to project said central region from one side to the other side thereof, whereby the glass sheet is pressed to a curved shape.

2. A method according to claim 1, wherein said first mold comprises a lower concave ring mold for placing the peripheral edge of the glass sheet thereon, and said second and third molds comprise a peripheral mold assembly and a central mold member surrounded by said peripheral mold assembly, said peripheral mold assembly and said central mold member jointly constituting an upper convex mold for mating with said lower concave ring mold, and wherein said step of pressing a third mold against a central region of the glass sheet comprises the steps of placing the glass sheet on said ring mold, thereafter lowering said peripheral mold assembly and said central mold member to press and clamp only said peripheral edge of the glass sheet between said peripheral mold assembly and said ring mold, and further lowering said central mold member to project said central region of the glass sheet from said one side to said other side thereof.

3. A method according to claim 2, wherein said convex ring mold, said peripheral mold assembly, and said central mold member jointly constitute a pressing apparatus, further including the steps of:

feeding the heated glass sheet from the heating furnace to said pressing apparatus with feed means; and preliminarily shaping the heated glass sheet with said feed means before the heated glass sheet is pressed by said pressing apparatus.

4. A method according to claim 3, wherein said peripheral mold assembly comprises a pair of front and rear side mold members for clapping front and rear peripheral edge portions of the glass sheet between themselves and said ring mold, said front and rear side mold members being spaced from each other in the direction in which the heated glass sheet is fed to said pressing apparatus by said feed means, and a pair of left and right side mold members for clamping left and right peripheral edge portions of the glass sheet between themselves and said ring mold, and wherein said step of lowering said peripheral mold assembly comprises the steps of clamping the front and rear peripheral edge portions of the preliminarily shaped glass sheet between said front and rear side mold members and said ring mold, and thereafter clamping the left and right peripheral edge portions of the preliminarily shaped glass sheet between said left and right side mold members and said ring mold.

5. A method according to claim 2, wherein said peripheral mold assembly comprises a unitary ring mold for mating with said lower ring mold.

6. A system for pressing a glass sheet, comprising:

a heating furnace for heating the glass sheet nearly to a softening point; and a pressing apparatus for clamping only a peripheral edge of the heated glass sheet at opposite sides thereof, and projecting only a central region of the glass sheet, which is surrounded by the clamped peripheral edge thereof, from one of the sides to the other side thereof, whereby the glass sheet is pressed to a curved shape, said pressing apparatus comprising:

a concave mold for engaging at least the peripheral edge of the glass sheet;

a movable mold assembly for clamping the peripheral edge of the glass sheet between itself and said concave mold;

a movable mold member surrounded by said movable mold assembly, said movable mold assembly and said movable mold member jointly constituting a convex mold for mating with said concave mold; and actuator means for moving said movable mold assembly to press the peripheral edge of the glass sheet from said one side thereof thereby to clamp the peripheral edge of the glass sheet between said movable mold assembly and said concave mold, and for thereafter moving said movable mold member to project the central region of the glass sheet toward said other side thereof.

7. A system according to claim 6, wherein said concave mold comprises a lower ring mold.

8. A system according to claim 7, wherein said movable mold assembly comprises a unitary ring mold for mating with said lower ring mold.

9. A system according to claim 6, further including a cooling device for quickly cooling the glass sheet pressed by said pressing apparatus thereby to temper the glass sheet, and a feed roll mechanism including feed means for feeding the glass sheet from said heating furnace to said pressing apparatus, said feed means comprising preliminary shaper rolls for preliminarily shaping the glass sheet heated by said heating furnace.

10. A system according to claim 9, wherein said movable mold assembly comprises a pair of front and rear side mold members for clamping front and rear peripheral edge portions of the glass sheet between themselves and said concave mold, said front and rear side mold members being spaced from each other in the direction in which the heated glass sheet is fed to said pressing apparatus by said preliminary shaper rolls, and a pair of left and right side mold members for clamping left and right peripheral edge portions of the glass sheet between themselves and said concave mold after the front and rear peripheral edges of the glass sheet are clamped.

* * * * *

UNITED STATES PATENT AND TRADEMARK OFFICE
CERTIFICATE OF CORRECTION

PATENT NO. : 5,122,177
DATED : June 16, 1992
INVENTOR(S) : Yoshizawa, Saikawa, Tanaka It is certified that error appears in the above-identified patent and that said Letters Patent is hereby corrected as shown below:

Column 5, line 41, Claim 4, "clapping" should read --clamping--.

Signed and Sealed this

Twenty-fifth Day of January, 1994

Attest:

BRUCE LEHMAN

*Attesting Officer*    *Commissioner of Patents and Trademarks*